April 6, 1965    J. HOROWITZ ETAL    3,177,121
SWIMMING POOL REACTOR FOR STUDYING MATERIALS UNDER IRRADIATION
Filed May 12, 1961    10 Sheets-Sheet 1

INVENTORS
JULES HOROWITZ
VICTOR RAIEVSKI
BY
Bacon & Thomas
ATTORNEYS

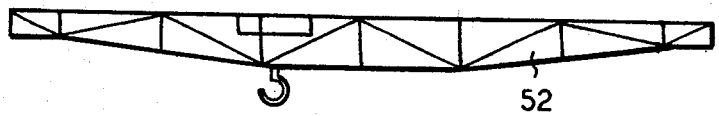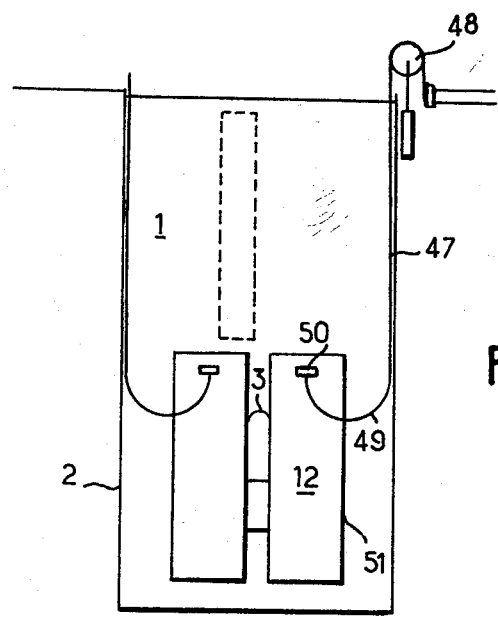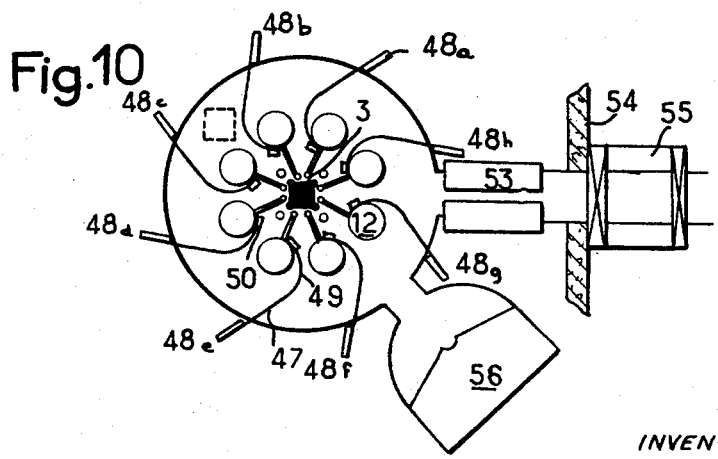

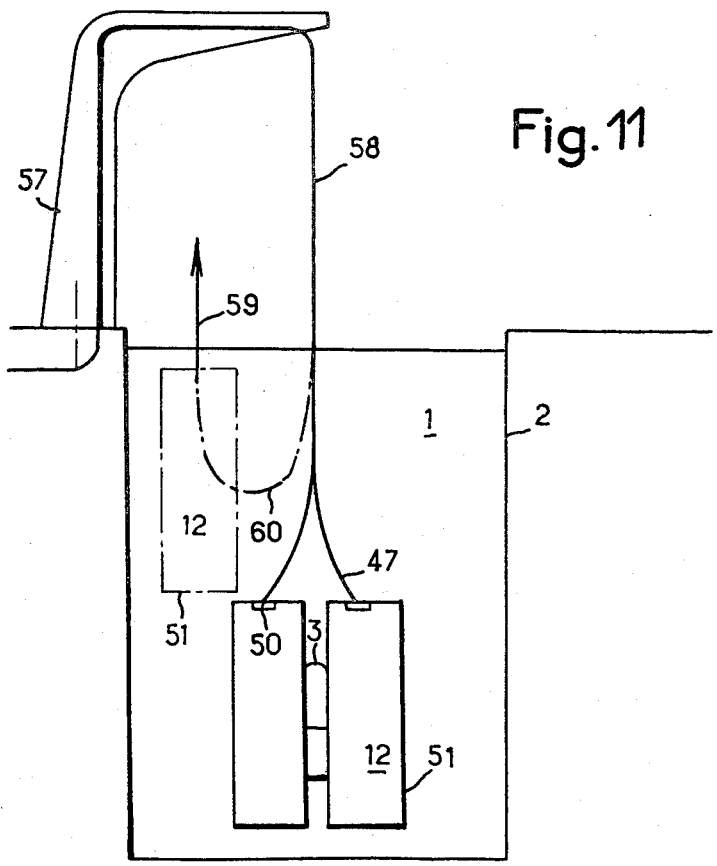
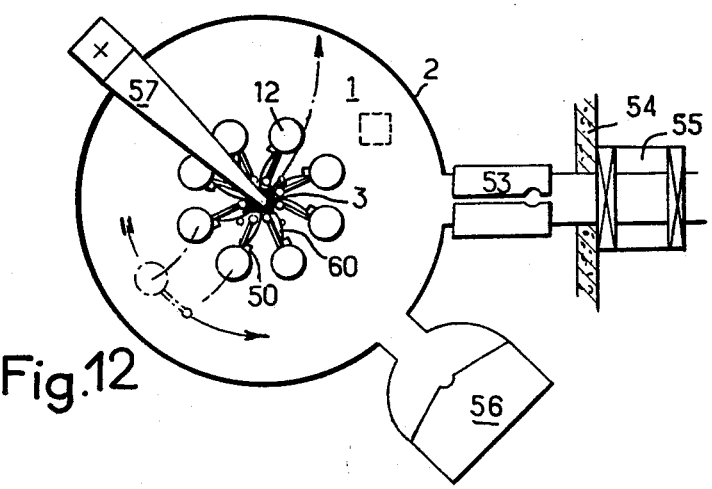

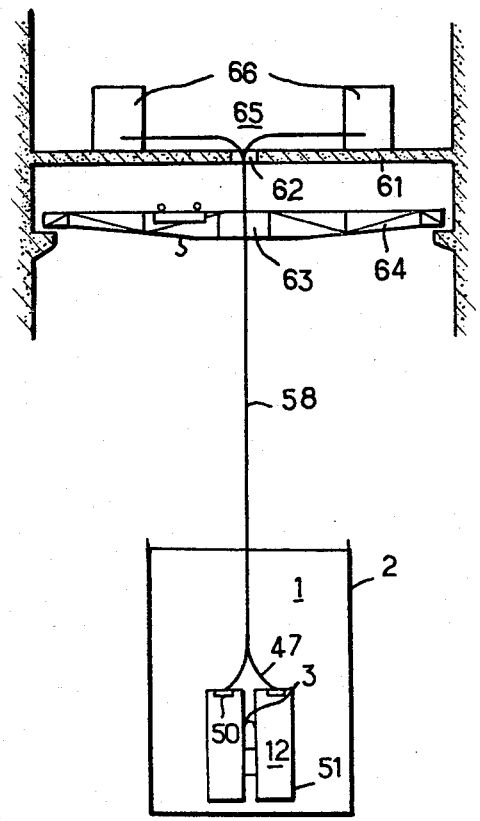

United States Patent Office 3,177,121
Patented Apr. 6, 1965

3,177,121
SWIMMING POOL REACTOR FOR STUDYING
MATERIALS UNDER IRRADIATION
Jules Horowitz, Paris, and Victor Raievski, Chatenay-Malabry, France, assignors to Commissariat a l'Energie Atomique, Paris, France
Filed May 12, 1961, Ser. No. 109,713
Claims priority, application France, May 20, 1960, 827,830
1 Claim. (Cl. 176—12)

The development of the nuclear industry requires radiation sources with easy access for studying the behaviour of certain materials under irradiation and in particular fuel elements for nuclear reactors.

In this connection research reactors have been proposed in which bodies to be irradiated are exposed to radiation from the core of the reactor by means of a number of channels rigidly fixed either to the biological shield or to the core. This procedure suffers a number of disadvantages including among others loss of adaptability as much in relation to positioning as to operation.

The present invention is concerned with a swimming pool reactor for studying materials under irradiation which allows experiments to be made without running into the same difficulties in use as in known reactors.

The invention provides a swimming pool reactor for the study of materials under irradiation comprising a core, means for cooling the core by independent forced circulation of water and means for controlling from a position directly under the reactor the movement of fuel elements, control rods and control instruments, the reactor including a casing immersed in the pool and having compartments in which the fuel elements of the core of the reactor are located, means such as carriages each capable of supporting articles for irradiation by bringing the said articles into the immediate neighbourhood of the core of the reactor, tracks for the carriages located at the bottom of the pool and extending radially relative to the core of the reactor, driving means co-operating with the carriages for moving the carriages on their tracks, means for observing by X-ray the irradiated articles, and manipulating means outside the pool for maneuvering the articles to be irradiated without breaking the mechanical and electrical connections to equipment outside the pool.

The faces of the casing may be provided with screens, according to the type of experiments; for example lead screens limiting overheating due to gamma radiation of the materials being studied and external structures. The articles to be irradiated may consist for example of immersed loops cooled by gas and containing the material to be studied and metering means for defining the received flux and may comprise reflectors designed to give isotropic flux of released neutrons.

In the realm of special reactors for the study and testing of materials, the loop may be designed as an assembly comprising generally a main conduit, exposed to irradiation flux and containing the material or organ which is to be submitted to testing by irradiation means may be provided for circulating a fluid over the material or organ at predetermined or controlled conditions of temperature and pressure. When, as is the case in the present invention, the loop is of the self-contained and detachable type the term "loop" may equally well designate not only the conduit in question but also the assembly of coupled parts provided for supporting it and controlling its position.

Referring to the schematic FIGURES 1 to 13 herewith there will be described hereafter a non-limitative example of construction of an atomic reactor of the swimming pool type in accordance with the invention.

FIGURE 9 is a schematic elevation of means for manipulating loops, the control of tension of the conduits being effected by mobile pulleys;

FIGURE 10 is a view from above of the arrangement of FIGURE 7;

FIGURE 11 is a schematic elevation of another arrangement for manipulating the loops, the control of tension of the conduits being effected by an arm;

FIGURE 12 shows a view from above of the arrangement of FIGURE 11;

FIGURE 13 is a schematic elevation of an arrangement for manipulating loops, the chamber for detecting ruptures of sheathes above the reactor chamber, the group of conduits crossing a special turning bridge through an orifice provided for this purpose.

In the drawing there have been shown only those elements necessary for an understanding of the invention, the corresponding elements of different figures carrying identical references.

Figure 1:
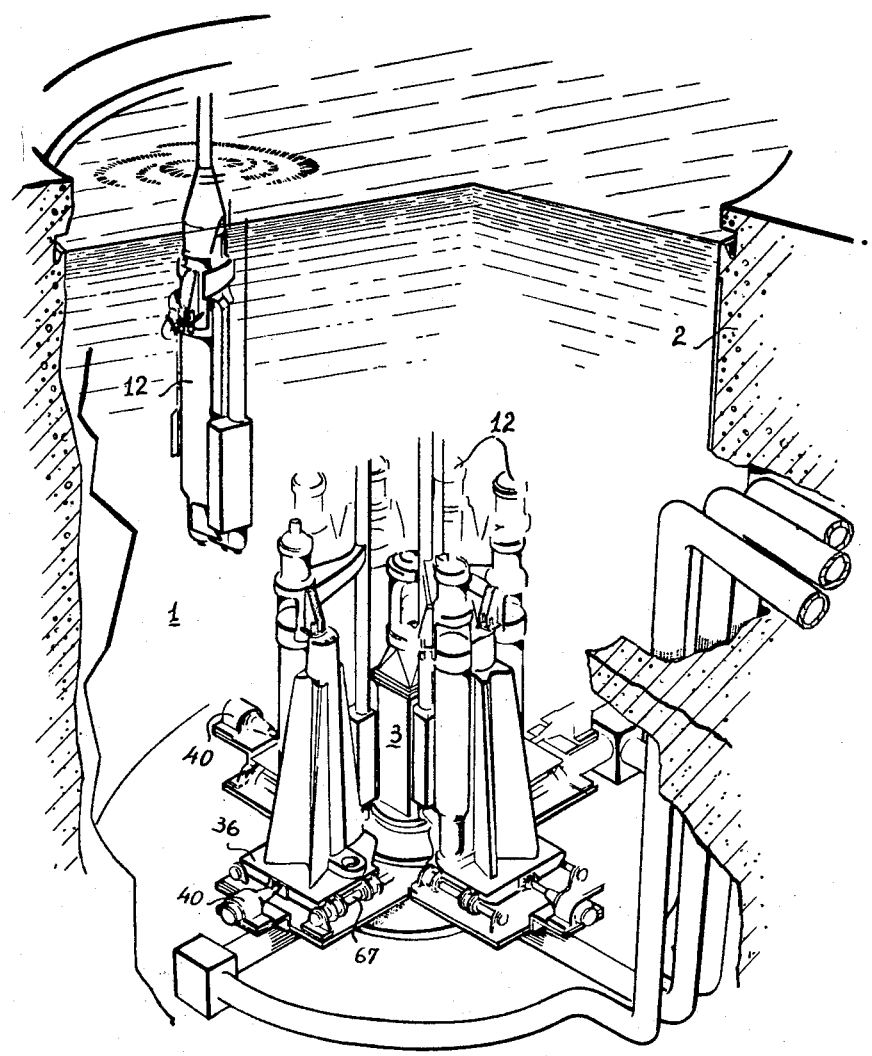
FIGURE 1 is a partial general assembly in perspective of a swimming pool type reactor according to the invention.

The swimming pool reactor shown in FIGURE 1 comprises basically, in a pool 1 defined by a biological protection shield 2 of concrete, a core 3 in which fuel elements are located, and around the core 3 independent irradiation loops 12. These independent loops 12 are movable relative to the core 3 of the reactor, their movement toward the core exposing them to the radiation flux of the core. In this connection the loops 12 are, as shown in FIGURE 1, mounted on carriages 36 movable along tracks 67 located at the bottom of the pool 1 and extending radially relative to the core 3, and the movements of the carriages 36 (and loops 12 which they support) are controlled by motors 40.

Figure 2:
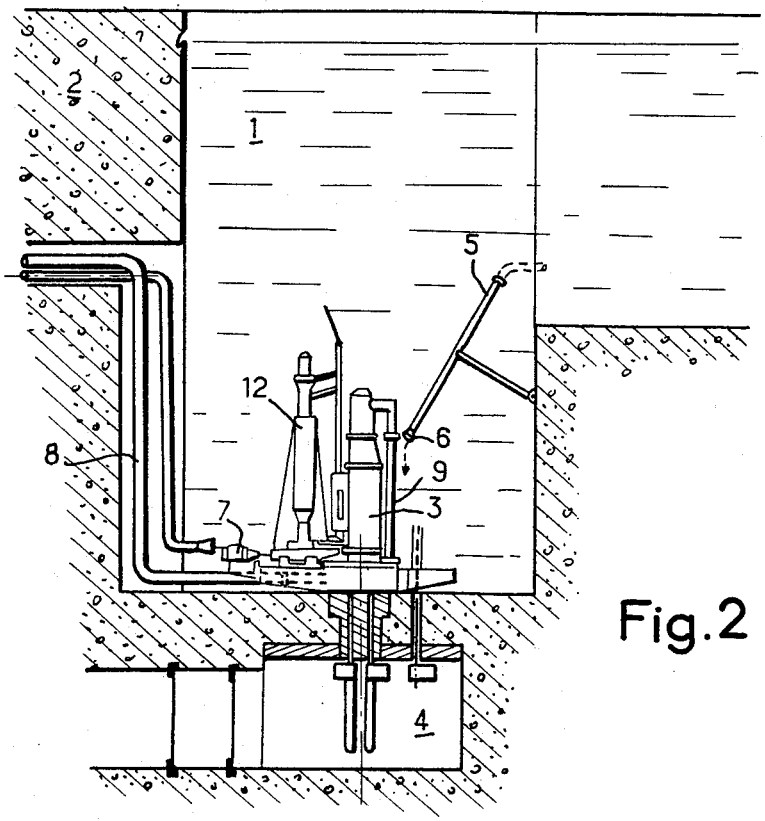
FIGURE 2 is a schematic elevation in section of the swimming pool reactor partially shown in FIGURE 1.

In FIGURE 2 is shown the pool 1 filled with water, the biological shield 2 in concrete, the core of the reactor 3 and there is also shown a control station 4 situated under the pool 1. Four pipes 5 (FIGURES 2 and 3) ending in conical diffusers 6 are located around the core and are provided to ensure circulation of water in the pool in co-operation with four aspirating nozzles 7 of which some only have been shown in the drawing.

Cooling water also circulates in the core 3 in a closed circuit from the inlet pipe 8 to the base of the reactor, upwardly in the conduit 9 then downwardly within the core, passing over the fuel elements 10 (see also FIG. 5) to finally be evacuated laterally by the piping 11.

Figure 3:
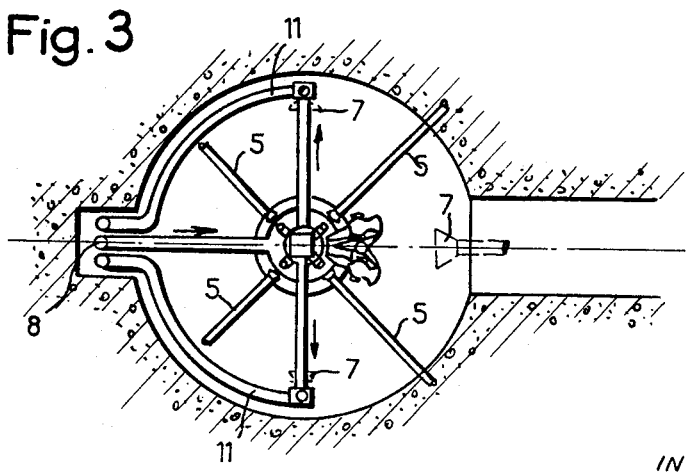
FIGURE 3 is a plan view of the reactor of FIGURE 2.

As can be seen in FIGURES 2 and 3 the inlet piping 8 is located on the diagonals of the square lattice formed by the core so as not to interfere with the individual loops such as 12 and so as not to hinder their movement.

Figure 4:
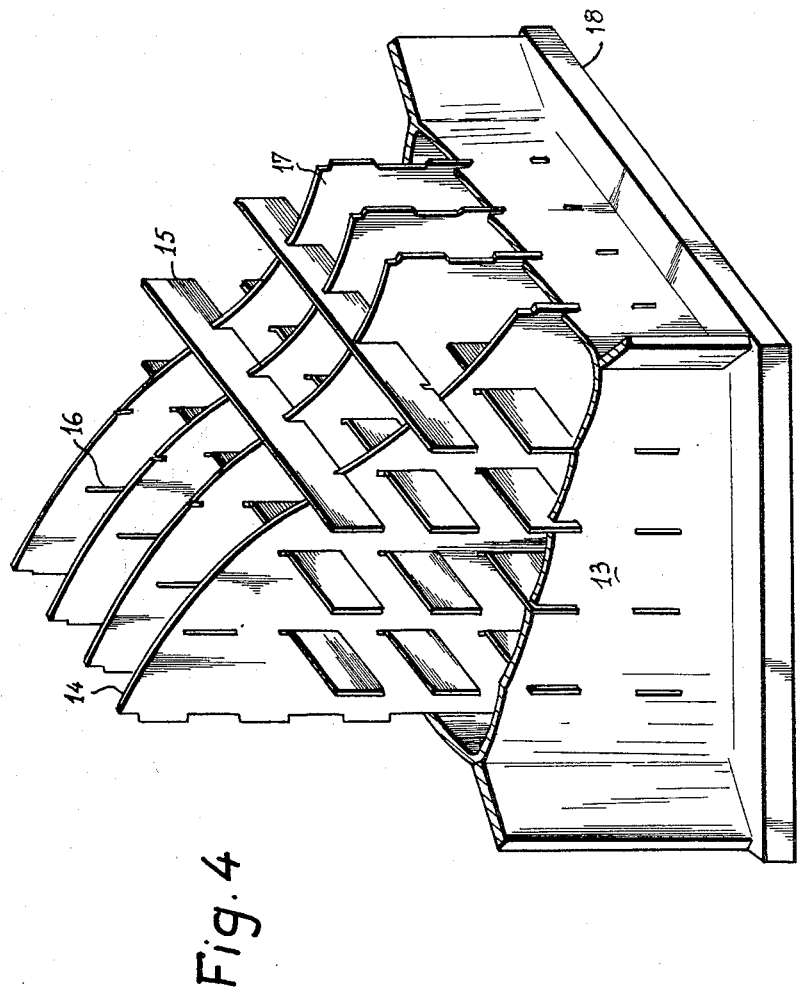
FIGURE 4 is a perspective view of the casing of the swimming pool reactor according to the invention.

In FIGURE 4 there is shown a casing of the "bottle case" type divided by walls 14 which form partitions and by transverse strips 15, the strips intersecting the walls by way of slits 16 provided for this purpose. By such an arrangement of partitions and strips there are defined a certain number of cells such as 17 in which can be located fuel elements, not shown.

To render the casing rigid it is provided at its lower parts and at its upper part with collars, of which only the lower collar 18 may be seen in FIGURE 4.

Figure 5:
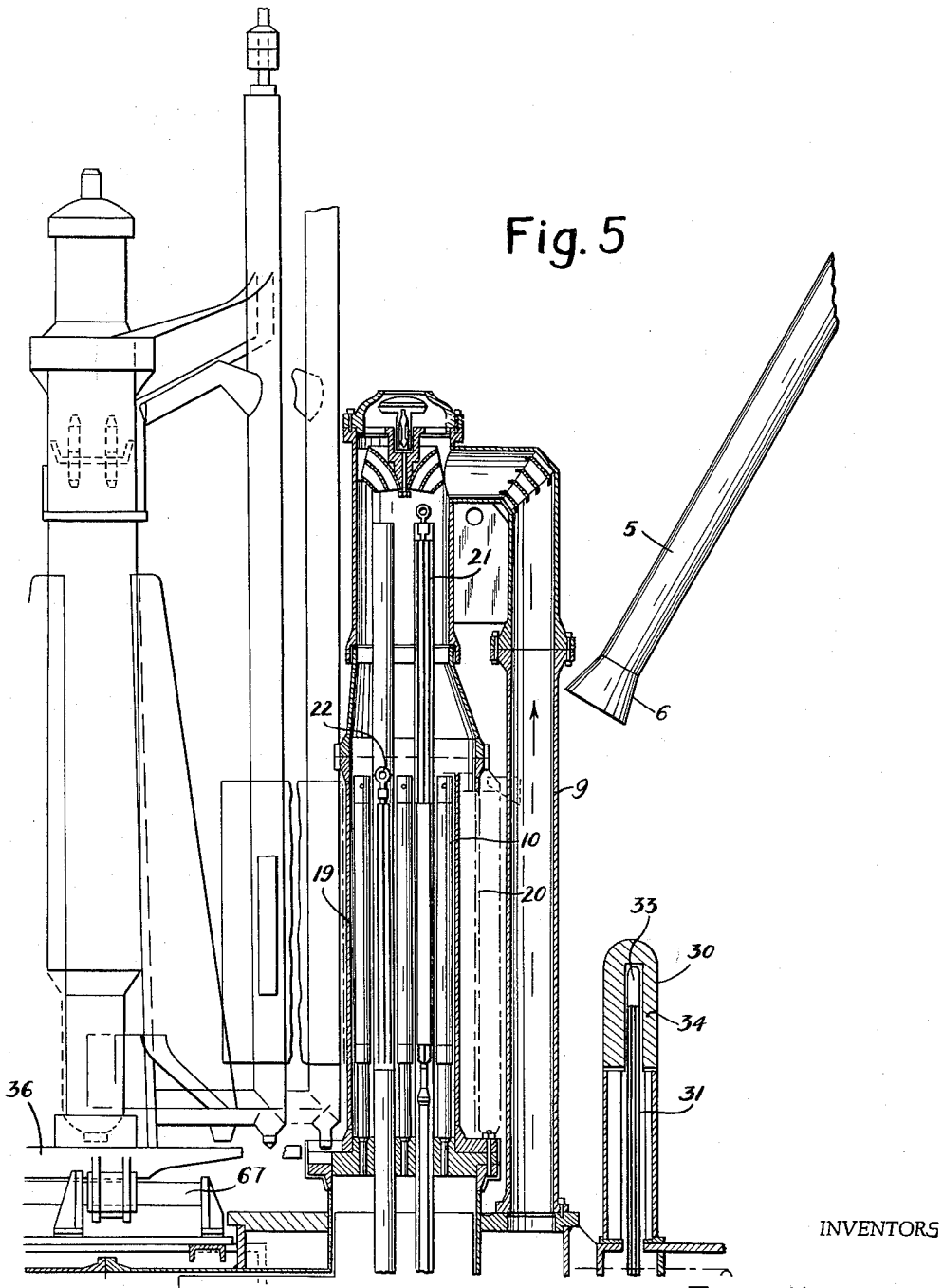
FIGURES 5 and 6 are sectional elevations showing respectively the upper and lower parts of the core of the reactor, control instruments and the control position.
Figure 6:
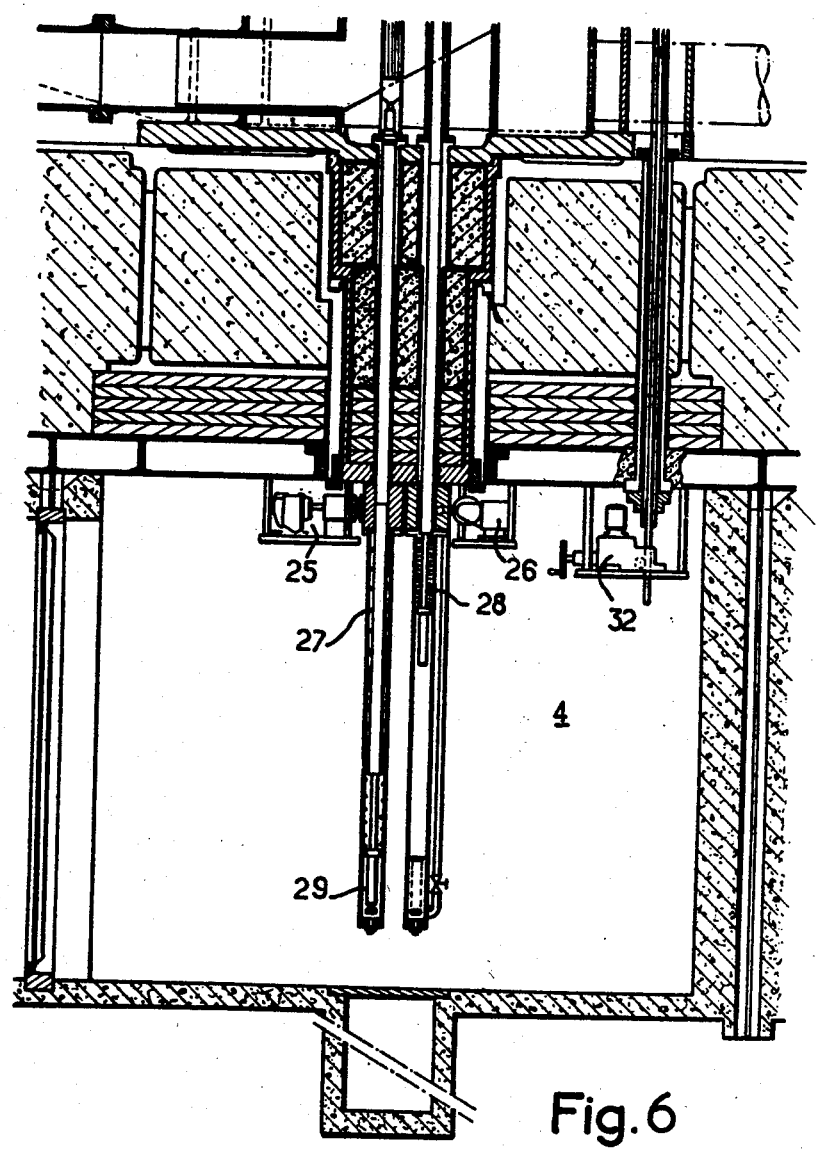

FIGURE 5 shows the casing 19 sectioned at an angle at the chain line 20, as well as the fuel elements or active bars 10. In this same figure are also shown two absorbent control rods 21 and 22 respectively in upper position (inoperative) and lower position (operative); each of these rods is formed of two parts of equal length, one active part having the length of a normal element, and one absorbent part of boron steel. These control rods are guided in square tubes such as 23 and 24. The control mechanisms 25 and 26 of FIGURE 6 effect the raising and lowering of these rods at slow speed; for operation as safety rods it suffices to cut the feed of the electromagnetic coupling of the devices 25 and 26 to suddenly drop the rods. This drop is accelerated by the release of springs 27 and 28 located at the lower part. Braking is ensured by a dash pot 29 at the end of the stroke.

Around the active mass of the reactor are provided a number of ionisation chambers such as 30 for indicating the reactivity of the reactor. Each ionisation chamber, such as 30, comprises basically a glove finger 31 into which is introduced from the chamber 4 through the intermediary of a mechanism 32 a counter 33. A lead mass 34 surrounds this counter to screen it from the influence of Gamma radiation.

Figure 7:
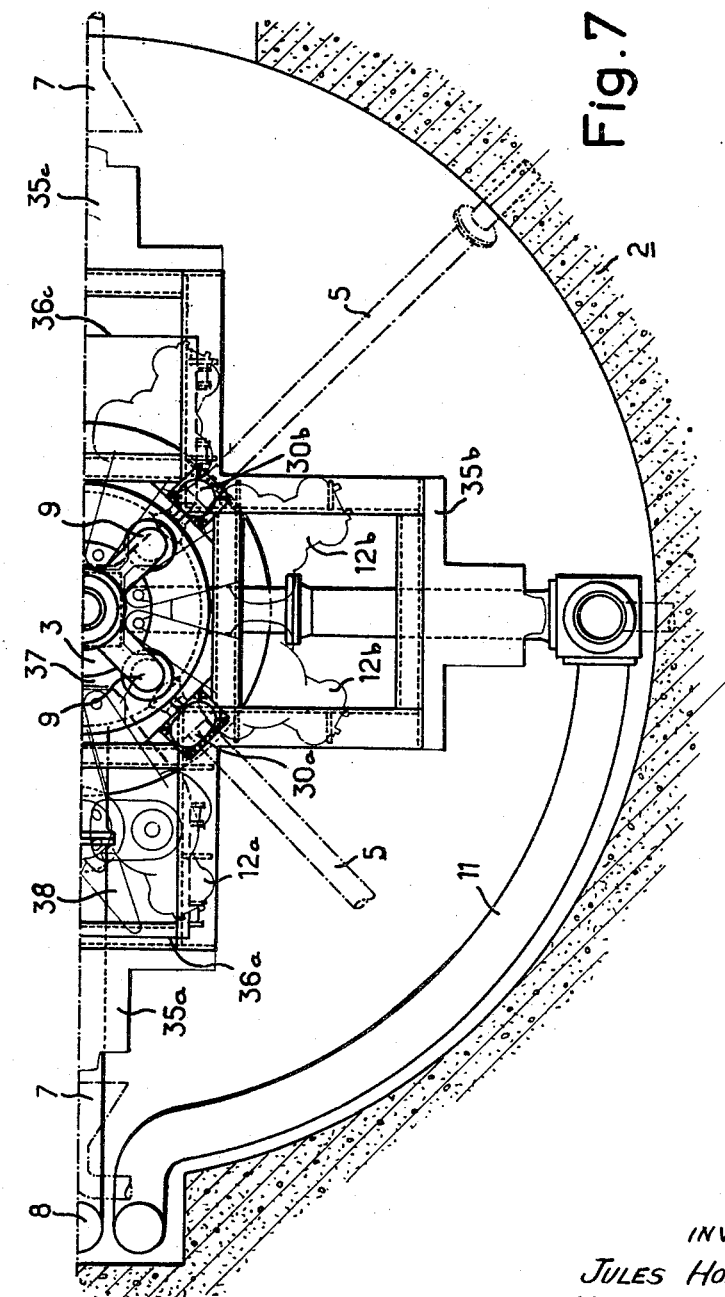
FIGURE 7 is a view from above and in detail of the lower part of FIGURE 3.

In FIGURE 7 are shown the supports for the individual loops 35a, 35b, 35c on which have been schematically shown the individual loops 12a, 12b and 12c. It is to be noticed that the carriage 36a carrying the loops 12a is not located against the core as are the loops 12b and 12c. It is to be seen that there is a space 37 between the loop 12a and the core of the reactor.

Also in FIGURE 7 there is shown the support post 38 of the loop 12a. The posts of the other loop assemblies have not been shown in order not to overload the figure. Around the core are located the ionisation chambers. They are four in number, 30a, 30b, 30c, 30d. Only the chambers 30a and 30b have been shown in this figure.

Figure 8:
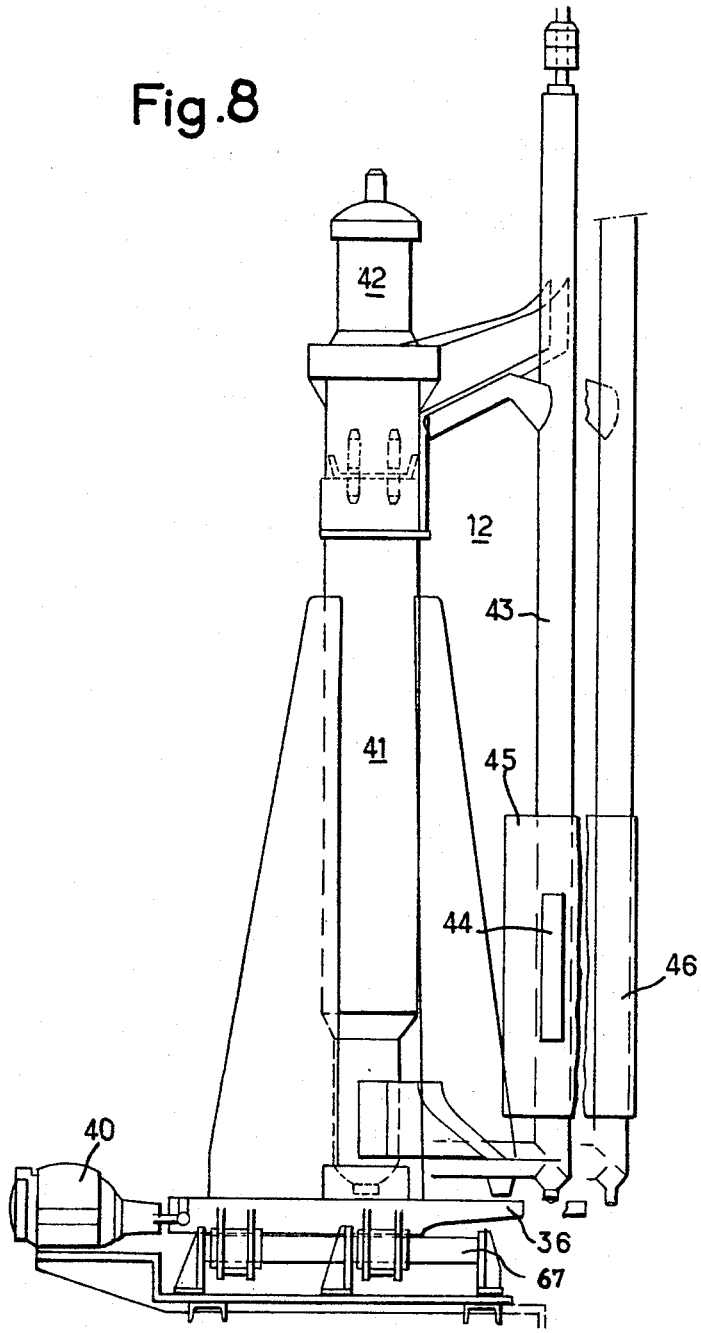
FIGURE 8 is an elevation of one of the irradiation loops shown in position on its carriage.

In FIGURE 8 is shown a type of loop mounted on its carriage 36 movable along tracks 67 by the electric motor 40. This loop comprises a gas circuit 41, through which gas is circulated by a blower motor 42, and includes a vertical pipe portion 43.

At the lower part of this portion 43 and on the side of the loop which lies against the reactor core when the carriage brings the loop into the working position, there is located the body 44 to be irradiated. In the case described it comprises a fuel element of a gas reactor surrounded by a diffusing mass of beryllium 45 placed behind a lead screen 46. In this way the fuel element under study is maintained under the physical conditions of temperature and radiation which it will encounter when used in the operation of a gas reactor. Means, not shown in the figure, are also provided to thermally insulate the gas loop, which is at a controllable temperature of 200–500° C., from the water of the pool which is at a temperature of the order of 40° C.

From what has been said, it will be seen that the loops are immersed in the pool and located adjacent the vertical faces of the core. From each extend the feeds and conductors for electrical purposes as well as the cooling fluid feed tubes. These different pipes can be classed in two categories:

(a) The conduits which must remain coupled during movement of the loop, such as the electrical feed for the motors 40 and the cooling gas blower, the electric feed for the water pump, the conductors for measurement of flow, pressure and gas temperature.

(b) Conduits which may be disconnected for movement, such as the gas feed pipes, electric conductors for control of the gas feed pumps, electric conductors for measurements relating to the element under test.

The operations effected on the loops are of different kinds, that is to say:

The precise location against the core without shocks at a perfectly controlled speed of all the loops successively;

The rapid removal of any one or more of these loops simultaneously to satisfy certain security requirements;

The movement of any loop to or from the uncoupling position located at the entry of the emptying channel locking chamber.

All these operations must be carried out with the loops immersed.

To effect placing in position as well as very rapid removal, the loops are placed in pairs on the immersed carriages 36 movable radially relative to the core 3 of the reactor. These radial movements give the advantage of being exact and perfectly controlled. Locking devices are provided on the mechanisms. The surface of the pool remains clear and facilitates a large number of transporting operations of any loop, for example to the uncoupling position located at the entry of the lock chamber of the emptying channel.

In a modification the loops can be located on individual carriages.

The most delicate operations consist of movement of a loop 12 without disconnecting it, followed by replacement in the reactor or a removal from the reactor. For effecting this operation while leaving the various conduits coupled, various arrangements are envisaged.

In one arrangement shown in FIGURE 9, the cables 47 grouping the different connections travel radially to the outside of the pool through channels not shown on the figure. Each cable passes thence on a pulley 48 of large radius and horizontal axis. This pulley can be raised or lowered in order to regulate the tension of the cable during the various maneuvers. The cable 47 descends vertically against the wall of the pool to rise again after having made a turn before reaching the junction boxes 50 which join it to the corresponding loop 12 schematically shown by the rectangle 51 in FIGURE 9. The movement of the loops is effected by a rotating bridge 52 located above the reactor. In FIGURE 10 which shows the pool from above is shown the arrangement of pulleys 48a to 48h, the disposition of the loops around the core 3, and the position of the cables 47 from each of the pulleys 48a to 48h and junction boxes 50.

There is also shown on this figure the emptying lock chamber 53 isolated from the uncoupling chamber 55 by the protecting wall 54. The radioscopic observation of the elements is effected in the chamber 56 provided for this purpose and which communicates with the pool.

In a variation of the foregoing embodiment shown in FIGURES 11 and 12 movement of the carriages is effected as before. To maneuver the cables through these movements an arm 57 controls the tension of the group 58 formed by the cables 47. The movement of the loops is effected by action as at 59 through a bridge, not shown. In FIGURE 12 is shown the position of the arm 57 with respect to the loops 12 as well as the bends 60 formed by the cables 47 for entering the junction boxes 50.

There is also shown in this figure the evacuation lock chamber 53 isolated from the uncoupling chamber 55 by the protecting wall 54. The radioscopic observation of the elements is carried out in chamber 56 which communicates with the pool.

Another variation of the arrangement for manipulation is shown in FIGURE 13. The conduits which leave loops 12 by the junction boxes 50 form an axial group 58 which traverses the platform 61 and 62 as well as the rotating bridge 64 at 63, the bridge being the means by which the loops are moved. The group of cables 58 terminates, after traversing the orifices 62 and 63, in a chamber 65 where is located apparatus 66 for the detection of ruptures in the sheaths.

It will be understood that this arrangement can be used in combination with means for placing loops in position on the carriages movable radially on rails.

It is evident that the invention is not limited to the methods of execution shown and described which have been given only as examples.

We claim:

In a swimming pool reactor having means defining a pool and a nuclear core in a closed casing in said pool, trackways on the bottom of said pool and extending generally radially of said cores; a carriage on each trackway and controllable means for selectively moving said carriages thereon toward and from said core; support means removably carried by each carriage for supporting material to be irradiated in close proximity to said core; means providing for radioscopic observation of said material; means including flexible conductors extending from said support means and upwardly to the exterior of said pool whereby said support means may be lifted from said carriages and said pool without rupturing said flexible conductors.

References Cited by the Examiner
UNITED STATES PATENTS

| | | | |
|---|---|---|---|
| 2,744,064 | 5/56 | Moore | 176—61 |
| 2,848,404 | 8/58 | Treshow | 176—44 |
| 2,870,076 | 1/59 | Koch | 176—17 |
| 2,872,398 | 2/59 | Ashley et al. | 176—84 |
| 2,937,127 | 5/60 | Flora | 176—39 |
| 2,954,334 | 9/60 | Stoops et al. | 176—92 X |
| 2,976,422 | 3/61 | Hill et al. | 176—39 X |

OTHER REFERENCES

Directory of Nuclear Reactors, vol. II, Research, Test and Experimental Reactors, IAEA, 1959, page 109.

"Nucleonics," July 1957, "Food-Irradiation Reactor," by D. T. Bray and C. F. Leyse, Fig. 1 and page 76.

CARL D. QUARFORTH, *Primary Examiner.*

REUBEN EPSTEIN, *Examiner.*